United States Patent
Guan et al.

(10) Patent No.: US 12,533,861 B2
(45) Date of Patent: Jan. 27, 2026

(54) MECHANICAL DRUM SUSPENSION TURN-UP FORMING STRUCTURE

(71) Applicants: MESNAC CO., LTD., Qingdao (CN); QINGDAO MESNAC MACHINERY & ELECTRIC ENGINEERING CO., LTD., Qingdao (CN)

(72) Inventors: Bingzheng Guan, Qingdao (CN); Xingrui Li, Qingdao (CN); Yihang Yu, Qingdao (CN); Yi Wang, Qingdao (CN); Meng Hu, Qingdao (CN); Jifeng Zhang, Qingdao (CN); Yu Yang, Qingdao (CN)

(73) Assignees: MESNAC CO., LTD., Qingdao (CN); QINGDAO MESNAC MACHINERY & ELECTRIC ENGINEERING CO., LTD., Qingdao (CN)

( * ) Notice: Subject to any disclaimer, the term of this patent is extended or adjusted under 35 U.S.C. 154(b) by 0 days.

(21) Appl. No.: 18/286,224

(22) PCT Filed: Jan. 6, 2022

(86) PCT No.: PCT/CN2022/070602
§ 371 (c)(1),
(2) Date: Oct. 9, 2023

(87) PCT Pub. No.: WO2023/040139
PCT Pub. Date: Mar. 23, 2023

(65) Prior Publication Data
US 2024/0375364 A1      Nov. 14, 2024

(30) Foreign Application Priority Data
Sep. 18, 2021   (CN) .......................... 202111101160.1

(51) Int. Cl.
*B29D 30/26*      (2006.01)

(52) U.S. Cl.
CPC .................................. *B29D 30/26* (2013.01)

(58) Field of Classification Search
CPC ...... B29D 30/24; B29D 30/244; B29D 30/26; B29D 30/28; B29D 30/32; B29D 30/72;
(Continued)

(56) References Cited

U.S. PATENT DOCUMENTS

| 4,145,238 A | * | 3/1979 | Bottasso | ................ B29D 30/28 |
| | | | | 156/401 |
| 2014/0034221 A1 | * | 2/2014 | Bignogno | ............ B29D 30/245 |
| | | | | 156/123 |

(Continued)

FOREIGN PATENT DOCUMENTS

JP        2006044036 A   *  2/2006

OTHER PUBLICATIONS

Mori D, JP-2006044036-A, machine translation. (Year: 2006).*

*Primary Examiner* — Sedef E Paquette
(74) *Attorney, Agent, or Firm* — Jiwen Chen; Joywin IP Law PLLC

(57) ABSTRACT

A mechanical drum suspension pull turn-up molding structure includes a main shaft assembly and a rear delay unloading, the rear delay unloading being arranged opposite to the main shaft assembly, the structure further includes a lock ring assembly and a turn-up assembly which are arranged on the main shaft assembly, there are two turn-up assemblies symmetrically arranged at two sides of the lock ring assembly, and the turn-up assemblies include a plurality of turn-up structures arranged at intervals around a circumference of the main shaft assembly, and the turn-up structure has a supporting position and a retracted position; a plurality of supporting plates, wherein the plurality of supporting plates correspond with the plurality of turn-up structures, and are arranged on the corresponding turn-up structures; a first driving assembly arranged on the main shaft assembly, and (Continued)

the first driving assembly being in drive connection with a plurality of turn-up structures.

5 Claims, 2 Drawing Sheets

(58) Field of Classification Search
CPC .... B29D 2030/2642; B29D 2030/3214; B29D 2030/3221; B29D 2030/3257; B29D 2030/3264; B29D 2030/3285
USPC .............................. 156/130.7, 414, 415, 421
See application file for complete search history.

(56) References Cited

U.S. PATENT DOCUMENTS

2018/0326682 A1* 11/2018 Guy ..................... B29D 30/247
2022/0314565 A1* 10/2022 Badolato ............. B29D 30/244

* cited by examiner

MECHANICAL DRUM SUSPENSION TURN-UP FORMING STRUCTURE

This is a U.S. national stage application of PCT Application No. PCT/CN2022/070602 under 35 U.S.C. 371, filed Jan. 6, 2022 in Chinese, which is hereby incorporated by reference.

CROSS-REFERENCE TO RELATED APPLICATION

This application claims priority to Chinese Patent Application No. 202111101160.1, filed to the China National Intellectual Property Administration on Sep. 19, 2021 and entitled "Mechanical Drum Suspension Pull Turn-up Molding Structure" which are incorporated herein by reference in its entirety.

TECHNICAL FIELD

The present invention relates to the field of tire production equipment, and in particular to a mechanical drum suspension pull turn-up molding structure.

BACKGROUND TECHNOLOGY

Currently, all of the capsule drums are used for the side wall-suspension pull turn-up molding, but there are problems that replacing the capsule of the capsule drum is complicated, the cost of the capsule is high, and the molding quality of the tire ovary is inferior to that of a mechanical drum. In the existing mechanical drum, since the roll-on side wall by the turn-up rod has an indentation, the finished tire may have a "red-sun" phenomenon. In addition, when the turn-up reaction is carried out by using the capsule drum, there are problems such as complexity in replacing the capsule, high capsule costs, and poor molding quality.

Therefore, there is a problem in the related art that a capsule drum suspension pull turn-up process used in the side wall suspension pull turn-up molding is costly.

SUMMARY OF THE INVENTION

The present invention provides a mechanical drum suspension pull turn-up molding structure, so as to solve the problem in the prior art that the cost of a capsule drum suspension pull turn-up process used in side wall suspension pull turn-up molding is high.

In an embodiment of the present invention, a mechanical drum suspension pull turn-up molding structure is provided, including: a main shaft assembly and a rear delay unloading, the rear delay unloading is arranged opposite to the main shaft assembly, the mechanical drum suspension pull turn-up molding structure further includes a lock ring assembly and a turn-up assembly arranged on the main shaft assembly, there are two turn-up assemblies, and the two turn-up assemblies are symmetrically arranged at two sides of the lock ring assembly, the turn-up assembly includes: a turn-up structure, wherein there are a plurality of turn-up structures, the plurality of turn-up structures are arranged at intervals around a circumference of the main shaft assembly, and the turn-up structure has a supporting position and a retracted position; a supporting plate, there are a plurality of supporting plates, wherein the plurality of supporting plates are in one-to-one correspondence with the plurality of turn-up structures, and the supporting plates are arranged on the corresponding turn-up structures so as to provide a lap platform for a side wall during the movement of the turn-up structures from the retracted position to the supporting position; a first driving assembly, wherein the first driving assembly is arranged on the main shaft assembly, and the first driving assembly is in drive connection with the plurality of turn-up structures; during the movement of the turn-up structure from the supporting position to the retracted position, the suspension arm of the rear delay unloading is able to stretch into a space between the side wall and the turn-up structure, and drive the side wall to move in a direction away from the turn-up structure.

In an embodiment of the present invention, the turn-up mechanism includes a turn-up connecting rod, the turn-up connecting rod being in drive connection with the first driving assembly, and the supporting plate being provided on the turn-up connecting rod.

In an embodiment of the present invention, the turn-up connecting rod includes a first connecting rod, a second connecting rod and a third connecting rod, the first connecting rod and the third connecting rod are movably connected to both sides of the second connecting rod in the length direction, respectively, the first connecting rod and the third connecting rod rotate relative to the second connecting rod, and one end of the second connecting rod close to the third connecting rod is in drive connection with the first driving assembly, and one end of the first connecting rod away from the second connecting rod abuts against the side wall or the lock ring assembly.

In an embodiment of the present invention, two ends of the supporting plate are respectively connected to a side of the first connecting rod away from the second connecting rod and a side of the third connecting rod away from the second connecting rod.

In an embodiment of the present invention, the turn-up connecting rod is connected to one end of the first driving assembly close to the lock ring assembly.

In an embodiment of the present invention, the supporting plate is provided with at least one roller, and the roller is rotatably arranged on the supporting plate.

In an embodiment of the present invention, the mechanical drum suspension pull turn-up molding structure further includes a limiting position assembly, the limiting position assembly is provided on the turn-up structure or the main shaft assembly, and the limiting position assembly abuts against the turn-up structure, so that the turn-up structure abuts against a side wall of a tire.

In an embodiment of the present invention, the limiting position assembly includes: a second driving assembly arranged on the turn-up structure or the main shaft assembly; a plurality of limiting positions, the plurality of limiting positions being in one-to-one correspondence with the plurality of turn-up structures, the second driving assembly is respectively in drive connection with one end of the plurality of limiting position portions, and the other end of the limiting position portions abuts against a turn-up connecting rod of the turn-up structure, and the second driving assembly is capable of driving the limiting position portion to move in a direction of approaching or away from the lock ring assembly, so as to the turn-up connecting rod abuts against the side wall.

In an embodiment of the present invention, the limiting position assembly includes at least one rubber ring; the supporting plate is provided with at least one accommodating groove matching with the rubber ring; and the rubber ring is respectively sleeved in the accommodating groove of each supporting plate.

In an embodiment of the present invention, the plurality of the turn-up structures are arranged at equal intervals.

By applying the technical solution of the present invention, the mechanical drum suspension pull turn-up molding structure of the present invention includes a main shaft assembly and a rear delay unloading, the rear delay unloading is arranged opposite the main shaft assembly, and the mechanical drum suspension pull turn-up molding structure further includes a lock ring assembly and a turn-up assembly arranged on the main shaft assembly, there are two turn-up assemblies, the two turn-up assemblies are symmetrically arranged at two sides of the lock ring assembly, and the turn-up assembly includes a turn-up structure, a supporting plate and a first driving assembly. There are a plurality of turn-up structures, the plurality of turn-up structures are arranged at intervals around a circumference of the main shaft assembly, and the turn-up structures have a supporting position and a retracted position; a plurality of supporting plates, wherein the plurality of supporting plates are in one-to-one correspondence with the plurality of turn-up structures, and the supporting plates are arranged on the corresponding turn-up structures, so as to provide a lap platform for a side wall during the movement of the turn-up structures from a retracted position to a supporting position; the first driving assembly is provided on the main shaft assembly, and the first driving assembly is in drive connection with the plurality of turn-up structures; during the movement of the turn-up structure from the supporting position to the retracted position, the suspension arm of the rear delay unloading is able to stretch into the space between the side wall and the turn-up structure, and drive the side wall to move in a direction away from the turn-up structure.

When using the mechanical drum suspension pull turn-up molding structure of the described structure, since the turn-up assembly is provided, the side wall of the tire is able to be backed up by the turn-up structure of the turn-up assembly, and in the process of the first driving assembly driving the turn-up structure to move from the retracted position to the supporting position, the supporting plate of the turn-up assembly is able to provide a supporting platform for the side wall which is not backed up, so that the side wall is prevented from bending. Furthermore, after the turn-up structure moves to the supporting position, at this time, the turn-up structure completes the turn-up of the side wall of the tire, and moves from the supporting position to the retracted position; and after the turn-up structure leaves the supporting position, the suspension arm of the rear delay unloading is able to stretch into the space between the side wall of the tire not backed up and the turn-up structure, and continues to turn-up the side wall of the tire. Therefore, when the mechanical drum suspension pull turn-up molding structure in the present invention is used, it is no longer necessary to frequently replace the capsule, thereby saving the costs and time for replacing the capsule. Hence, the mechanical drum suspension pull turn-up structure in the present invention effectively solves the problem in the prior art that the cost of a capsule drum suspension pull turn-up process used in the side wall suspension pull turn-up molding is high.

BRIEF DESCRIPTION OF THE DRAWINGS

The accompanying drawings, which form a part of the present invention, are used for providing a further understanding of the present invention. The schematic embodiments and illustrations of the present invention are used for explaining the present invention, and do not form improper limits to the present invention. In the drawings.

The figures include the following reference signs:

10, Main shaft assembly; 20, Rear delay unloading; 21, Suspension arm; 30, Lock ring assembly; 40, Turn-up assembly; 41, Turn-up structure; 411, Turn-up connecting rod; 4111, First connecting rod; 4112, Second connecting rod; 4113, Third connecting rod; 42, Supporting plate; 43, First driving assembly; 50, Limiting position assembly; 51, Second driving assembly; 52, Limiting portion.

DETAILED DESCRIPTION OF THE EMBODIMENTS

It is important to note that the embodiments of the present invention and the characteristics in the embodiments may be combined under the condition of no conflicts. The present invention will be described below with reference to the drawings and embodiments in detail.

It is noted that, unless otherwise indicated, all technical and scientific terms used herein have the same meaning as commonly understood by one of ordinary skill in the art to which this application belongs.

In the present invention, unless specified to the contrary, the directional terms such as "upper", "lower", "top", and "bottom" are generally used for the directions shown in the figures, or for the components themselves in vertical, vertical, or gravitational directions; likewise, for ease of understanding and description, "inner and outer" refer to inner and outer relative to the outline of each component itself, but the described orientation is not used to limit the present invention.

In order to solve the problem in the prior art that a capsule drum suspension pull turn-up process used in side wall suspension pull turn-up molding has a high cost, the present invention provides a mechanical drum suspension pull turn-up molding structure.

Figure 1:
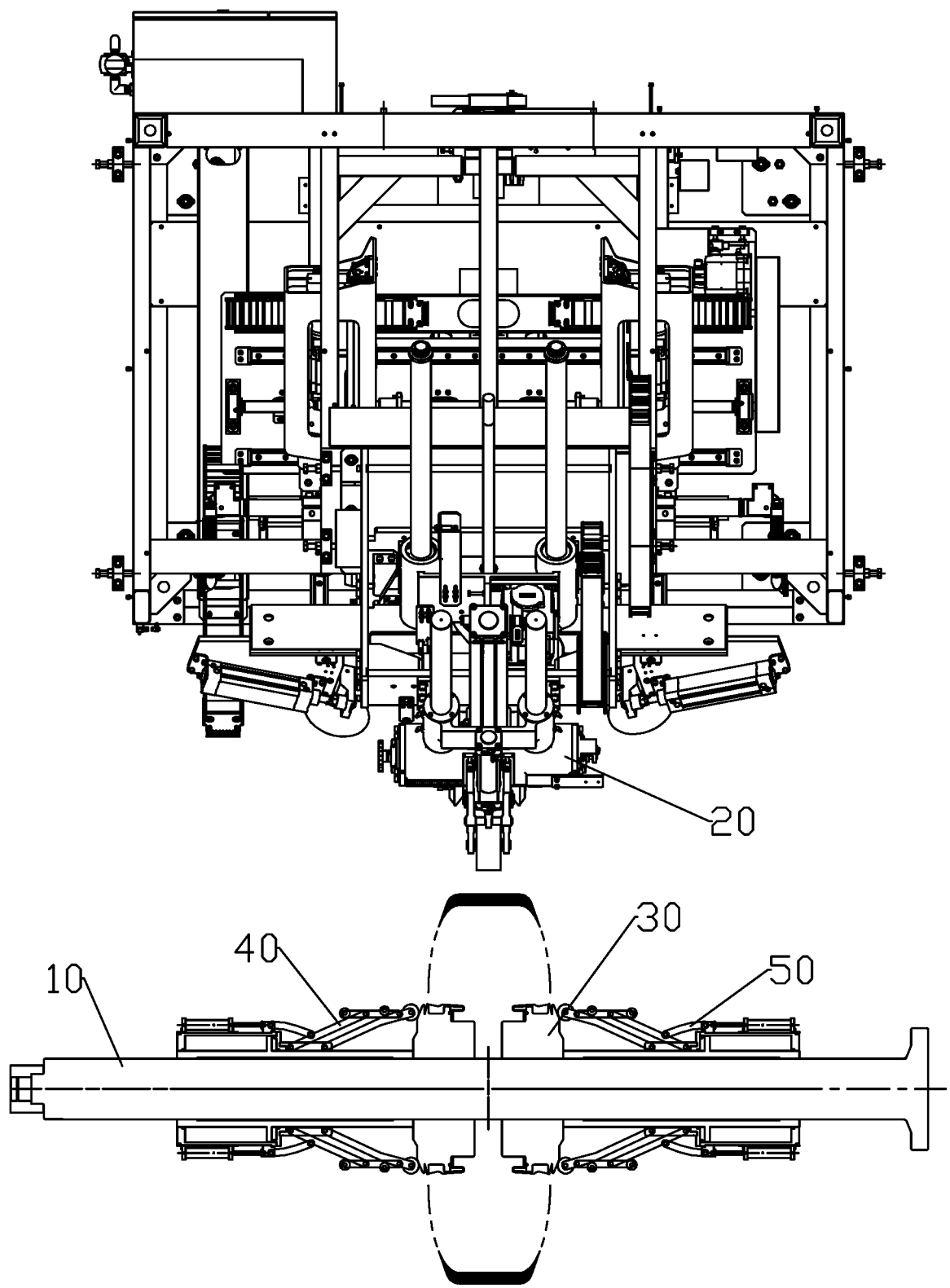
FIG. 1 is a schematic structural view of a mechanical drum suspension pull turn-up molding structure according to a specific embodiment of the present invention.
Figure 2:
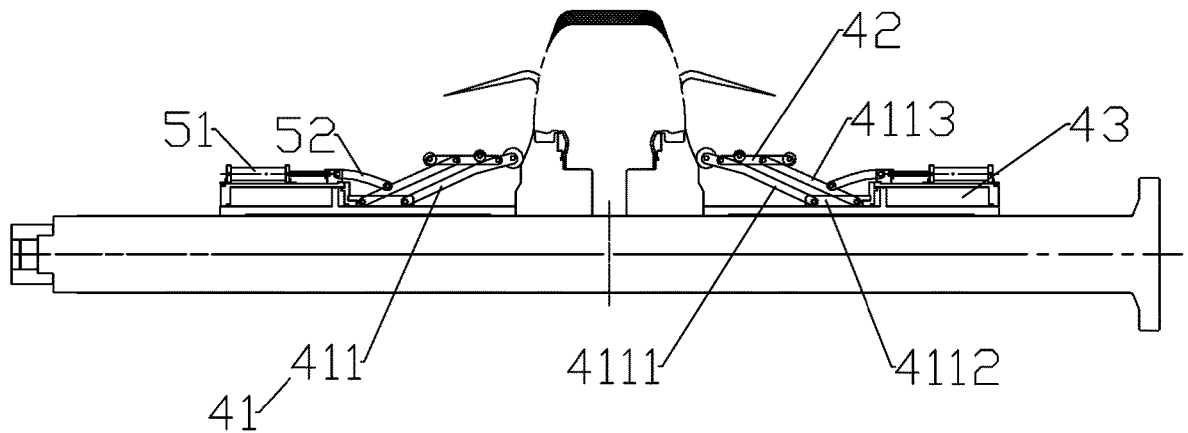
FIG. 2 shows a schematic view of the structure of the mechanical drum suspension pull turn-up structure in FIG. 1 when the turn-up structure of the mechanical drum suspension pull turn-up structure is in a retracted position.
Figure 3:
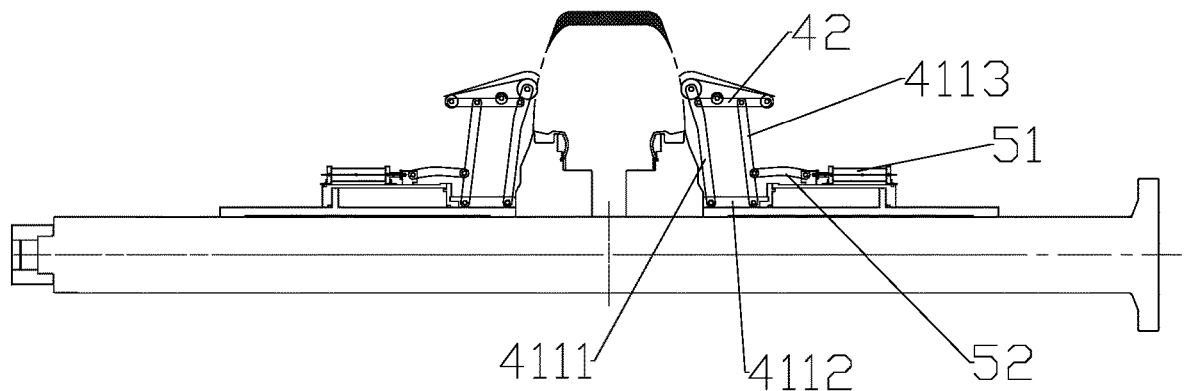
FIG. 3 is a schematic view showing the structure of the mechanical drum suspension pull turn-up structure in FIG. 1 when the turn-up structure of the mechanical drum suspension pull turn-up structure is in a supporting position.
Figure 4:
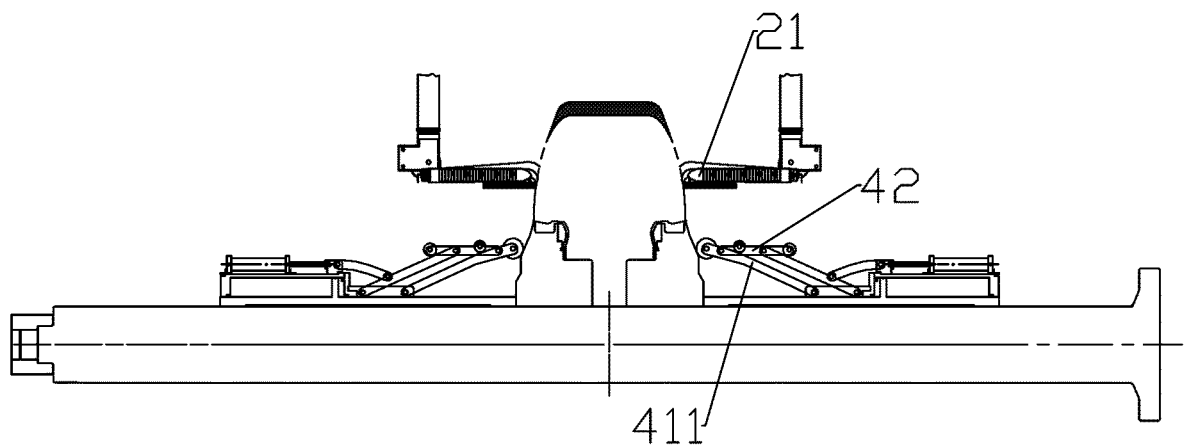
FIG. 4 shows a schematic structural view of the mechanical drum suspension pull turn-up structure in FIG. 3, wherein the turn-up structure of the mechanical drum suspension pull turn-up structure moves from a supporting position to a retracted position.

As shown in FIGS. 1-4, the mechanical drum suspension pull turn-up molding structure in the present invention includes a main shaft assembly 10 and a rear delay unloading 20, the rear delay unloading 20 is arranged opposite the main shaft assembly 10, and the mechanical drum suspension pull turn-up molding structure further includes a lock ring assembly 30 and a turn-up assembly 40 arranged on the main shaft assembly 10, there are two turn-up assemblies 40, the two turn-up assemblies 40 are symmetrically arranged at two sides of the lock ring assembly 30, and the turn-up assembly 40 includes a turn-up structure 41, a supporting plate 42 and a first driving assembly 43. A plurality of turn-up structures 41 are provided, the plurality of turn-up structures 41 are arranged at intervals around a circumference of the main shaft assembly 10, and the turn-up structures 41 have a supporting position and a retracted position; there are a plurality of supporting plates 42, the plurality of supporting plates 42 are in one-to-one correspondence with the plurality of turn-up structures 41, and the supporting plates 42 are arranged on the corresponding turn-up structures 41, so as to provide a lap platform for a side wall during the movement of the turn-up structures 41 from a retracted position to a supporting position; the first driving assembly 43 is arranged on the main shaft assembly 10, and the first driving assembly 43 is in drive connection with the plurality of turn-up structures 41; during the movement of the turn-up structure 41 from the supporting position to the retracted position, the suspension arm 21 of the rear delay unloading 20 is able to stretch into the space between the side wall and the turn-up structure 41, and drive the side wall to move in a direction away from the turn-up structure 41.

Using the above-described structure, the turn-up structure 41 of the turn-up assembly 40 is able to be used to turn-up the side wall of the tire, and during the process that the first driving assembly 43 drives the turn-up structure 41 to move from the retracted position to the supporting position. The supporting plate 42 of the turn-up assembly 40 is able to provide a supporting platform for the non-turn-up side walls, thereby preventing the side walls from bending. Furthermore, after the turn-up structure 41 moves to the supporting position, at this time, the turn-up structure 41 completes the turn-up of the side wall of the tire, and moves from the supporting position to the retracted position; and after the turn-up structure 41 leaves the supporting position, the suspension arm 21 of the rear delay unloading 20 is able to stretch into the space between the side wall of the tire not backed up and the turn-up structure 41, and continue to turn-up the side wall of the tire. Therefore, when the mechanical drum suspension pull turn-up molding structure in the present invention is used, it is no longer necessary to frequently replace the capsule, thereby saving the costs and time for replacing the capsule. Hence, the mechanical drum suspension pull turn-up structure in the present invention effectively solves the problem in the prior art that the cost of a capsule drum suspension pull turn-up process used in the side wall suspension pull turn-up molding is high.

It should be noted that, in the present invention, the rear delay unloading 20 is arranged on a molding machine or on the ground.

Specifically, the turn-up structure 41 includes a turn-up connecting rod 411, the turn-up connecting rod 411 is in drive connection with the first driving assembly 43, and the supporting plate 42 is provided on the turn-up connecting rod 411. That is to say, in the present invention, the switch of the turn-up structure 41 between the supporting position and the retracted position is achieved by the first driving assembly 43 driving the turn-up connecting rod 411. Furthermore, in the process of the first driving assembly 43 driving the turn-up connecting rod 411 to move, the turn-up connecting rod 411 abuts against the side wall of the tire to turn-up the side wall of the tire; at the same time, the turn-up connecting rod 411 also drives the supporting plate 42 to move together; and the part of the side wall which is not turn-up is lapped on the supporting plate 42 without falling downwards under the action of gravity, thereby ensuring that the surface of the side wall which is turn-up is more flat.

In a specific embodiment of the present invention, the turn-up connecting rod 411 includes a first connecting rod 4111, a second connecting rod 4112, and a third connecting rod 4113. The first connecting rod 4111 and the third connecting rod 4113 are movably connected to both sides of the second connecting rod 4112 in the lengthwise direction. The first connecting rod 4111 and the third connecting rod 4113 rotate relative to the second connecting rod 4112, one end of the second connecting rod 4112 close to the third connecting rod 4113 is in drive connection with the first driving assembly 43, and one end of the first connecting rod 4111 away from the second connecting rod 4112 abuts against the side wall or the lock ring assembly 30. Furthermore, both ends of the supporting plate 42 are respectively connected to the side of the first connecting rod 4111 away from the second connecting rod 4112 and the side of the third connecting rod 4113 away from the second connecting rod 4112. In this way, since the two ends of the supporting plate 42 are respectively connected to the first connecting rod 4111 and the third connecting rod 4113, the stability of the supporting plate 42 is able to be effectively ensured when the turn-up connecting rod 411 drives the supporting plate 42 to move together, and the supporting plate 42 is prevented from being deflected. Meanwhile, in this embodiment, when the first driving assembly 43 drives the turn-up connecting rod 411 to move, the first driving assembly 43 actually drives the second connecting rod 4112 to move. Furthermore, since the end of the first connecting rod 4111 away from the second connecting rod 4112 abuts against the side wall or the lock ring assembly 30. Hence, when the second connecting rod 4112 moves, the second connecting rod 4112 drives the first connecting rod 4111 and the third connecting rod 4113 to move together. Thus, the supporting plate 42 is driven to move.

Specifically, the turn-up connecting rod 411 is connected to one end of the first driving assembly 43 close to the lock ring assembly 30. In this way, the overall length of the turn-up connecting rod 411 is able to be effectively reduced, so that the turn-up connecting rod 411 is able to turn up on the side wall of the tire during turn-up process. Thus, a large angle turn-up is achieved, or the included angle between the turn-up connecting rod 411 and the main shaft assembly 10 is increased, or in other words, the included angle between the turn-up connecting rod 411 and the tire is reduced, so that the axial component force generated by the turn-up connecting rod 411 and the side wall of the tire is reduced. This effectively reduces the indentation in this section of the side wall.

Specifically, at least one roller is disposed on the supporting plate 42, and the roller is rotatably disposed on the supporting plate 42. By this arrangement, it is able to be ensured that, during the turn-up operation of the turn-up connecting rod 411 to turn-up the side wall of the tire, the side wall that is not backed up and is spliced on the supporting plate 42 is able to slide on the supporting plate 42 along with the movement of the turn-up connecting rod 411 and be turn-up by the turn-up connecting rod 411. Therefore, by providing the roller on the supporting plate 42, it is possible to ensure that the slide of the side wall, which is not backed up, on the supporting plate 42 is smoother.

In an embodiment of the present invention, two rollers are disposed on each supporting plate 42 and spaced apart from each other. Of course, the number of the drums is able to be adjusted according to actual usage conditions.

It should be noted that, in the present invention, the mechanical drum suspension pull turn-up molding structure further includes a limiting position assembly 50, the limiting position assembly 50 is provided on the turn-up structure 41 or the main shaft assembly 10, and the limiting position assembly 50 abuts against the turn-up structure 41, so that the turn-up structure 41 abuts against the side wall of the tire. In the present invention, during the movement of the turn-up structure 41 from the retracted position to the supporting position and the turn-up of the side wall of the tire, it is required that the turn-up connecting rod 411 always keeps abutting against the side wall of the tire. Therefore, by arranging the limiting position assembly 50 and making the limiting position assembly 50 abut against the turn-up structure 41, it is ensured that the limiting position assembly 50 supplies a pressing force to the turn-up structure 41, thereby ensuring that the turn-up connecting rod 411 of the turn-up structure 41 is able to keep abutting against the side wall. That is to say, the purpose of arranging the limiting position assembly 50 in the present invention is to ensure that the turn-up structure 41 is able to move along a pre-set direction without deviating from the pre-set movement direction.

In a specific embodiment of the present invention, the limiting position assembly 50 includes a second driving assembly 51 and a position limiting portion 52. The second driving assembly 51 is arranged on the turn-up structure 41 or the main shaft assembly 10; there are a plurality of limiting portions 52; the plurality of limiting portions 52 are in one-to-one correspondence with a plurality of turn-up structures 41; a second driving assembly 51 is respectively in drive connection with one end of the plurality of limiting portions 52; the other end of the limiting portion 52 abuts against the turn-up connecting rod 411 of the turn-up structure 41; and the second driving assembly 51 is able to drive the limiting portion 52 to move in a direction close to or far away from the lock ring assembly 30, so that the turn-up connecting rod 411 abuts against the side wall.

In a non-illustrated embodiment of the present invention, the limiting position assembly 50 includes at least one rubber ring, at least one receiving groove fitted with the rubber ring is provided on the supporting plate 42, and the rubber ring is respectively sleeved in the receiving groove of each supporting plate 42. Since the supporting plates 42 are provided along a circumference of the main shaft assembly 10 in the present invention, each rubber ring is sleeved on all the supporting plates 42.

Specifically, the plurality of turn-up structures 41 are arranged at equal intervals. In this way, during the process of turn-up the side wall by the turn-up structure 41, it is ensured that the force received by the side wall is more uniform, thereby ensuring the effect of turn-up.

From the above description, it can be seen that the described embodiments of the present invention achieve the following technical effects: when the mechanical drum suspension pull turn-up molding structure in the present invention is used, it is no longer necessary to frequently replace the capsule, thereby saving the costs and time for replacing the capsule. Hence, the mechanical drum suspension pull turn-up structure in the present invention effectively solves the problem in the prior art that the cost of the capsule drum suspension pull turn-up process used in the side wall suspension pull turn-up molding is high.

It should be noted that the terms "first" and "second" in the description, claims, and accompanying drawings of the present invention are used to distinguish similar objects, and are not necessarily used to describe a specific sequence or order. It should be understood that the data so used may be interchanged where appropriate so that the embodiments of the present invention described herein can be implemented in sequences other than those illustrated or described herein.

The foregoing descriptions are merely exemplary embodiments of the present invention, but are not intended to limit the present invention. For those skilled in the art, the present invention may have various modifications and variations. Any modifications, equivalent replacements, improvements and the like made within the spirit and principle of the present invention shall belong to the scope of protection of the present invention.

The invention claimed is:

1. A mechanical drum suspension pull turn-up molding structure, comprising a main shaft assembly (10) and a rear delay unloading (20), wherein the rear delay unloading (20) is arranged opposite to the main shaft assembly (10), the mechanical drum suspension pull turn-up molding structure further comprises a lock ring assembly (30) and a turn-up assembly (40) arranged on the main shaft assembly (10), there are two turn-up assemblies (40), and the two turn-up assemblies (40) are symmetrically arranged at two sides of the lock ring assembly (30), the turn-up assembly (40) comprises:
a turn-up structure (41), wherein there are a plurality of turn-up structures (41), the plurality of turn-up structures (41) are arranged at intervals around a circumference of the main shaft assembly (10), and the turn-up structure (41) has a supporting position and a retracted position;
a supporting plate (42), there are a plurality of supporting plates (42), wherein the plurality of supporting plates (42) are in one-to-one correspondence with the plurality of turn-up structures (41), and the supporting plates (42) are arranged on the corresponding turn-up structures (41) so as to provide a lap platform for a side wall during the movement of the turn-up structures (41) from the retracted position to the supporting position;
a first driving assembly (43), wherein the first driving assembly (43) is arranged on the main shaft assembly (10), and the first driving assembly (43) is in drive connection with the plurality of turn-up structures (41);
during the movement of the turn-up structure (41) from the supporting position to the retracted position, a suspension arm (21) of the rear delay unloading (20) is able to stretch into a space between the side wall and the turn-up structure (41), and drive the side wall to move in a direction away from the turn-up structure (41);
wherein the turn-up structure (41) comprises:
a turn-up connecting rod (411), the turn-up connecting rod (411) being in drive connection with the first driving assembly (43), and the supporting plate (42) being provided on the turn-up connecting rod (411),
wherein the turn-up connecting rod (411) comprises a first connecting rod (4111), a second connecting rod (4112) and a third connecting rod (4113), the first connecting rod (4111) and the third connecting rod (4113) are movably connected to both sides of the second connecting rod (4112) in the length direction, respectively, the first connecting rod (4111) and the third connecting rod (4113) rotate relative to the second connecting rod (4112), and one end of the second connecting rod (4112) close to the third connecting rod (4113) is in drive connection with the first driving assembly (43), and one end of the first connecting rod (4111) away from the second connecting rod (4112) abuts against the side wall or the lock ring assembly (30).

2. The mechanical drum suspension pull turn-up molding structure according to claim 1, wherein two ends of the supporting plate (42) are respectively connected to a side of the first connecting rod (4111) away from the second connecting rod (4112) and a side of the third connecting rod (4113) away from the second connecting rod (4112).

3. The mechanical drum suspension pull turn-up molding structure according to claim 1, wherein the mechanical drum suspension pull turn-up molding structure further comprises a limiting position assembly (50), the limiting position assembly (50) is provided on the turn-up structure (41) or the main shaft assembly (10), and the limiting position assembly (50) abuts against the turn-up structure (41), so that the turn-up structure (41) abuts against a side wall of a tire; and wherein the limiting position assembly (50) comprises at least one rubber ring; the supporting plate (42) is provided with at least one accommodating groove matching with the rubber ring; and the rubber ring is respectively sleeved in the accommodating groove of each supporting plate (42);

wherein the limiting position assembly (50) comprises:
  a second driving assembly (51) arranged on the turn-up structure (41) or the main shaft assembly (10);
  a plurality of limiting position portions (52), the plurality of limiting position portions (52) being in one-to-one correspondence with the plurality of turn-up structures (41), the second driving assembly (51) is respectively in drive connection with one end of the plurality of limiting position portions (52), and the other end of the limiting position portions (52) abuts against a turn-up connecting rod (411) of the turn-up structure (41), and the second driving assembly (51) is capable of driving the limiting position portions (52) to move in a direction of approaching or away from the lock ring assembly (30), so that the turn-up connecting rod (411) abuts against the side wall.

4. The mechanical drum suspension pull turn-up molding structure according to claim 1, wherein the plurality of the turn-up structures (41) are arranged at equal intervals.

5. A mechanical drum suspension pull turn-up molding structure, comprising a main shaft assembly (10) and a rear delay unloading (20), wherein the rear delay unloading (20) is arranged opposite to the main shaft assembly (10), the mechanical drum suspension pull turn-up molding structure further comprises a lock ring assembly (30) and a turn-up assembly (40) arranged on the main shaft assembly (10), there are two turn-up assemblies (40), and the two turn-up assemblies (40) are symmetrically arranged at two sides of the lock ring assembly (30), the turn-up assembly (40) comprises:

a turn-up structure (41), wherein there are a plurality of turn-up structures (41), the plurality of turn-up structures (41) are arranged at intervals around a circumference of the main shaft assembly (10), and the turn-up structure (41) has a supporting position and a retracted position;
  a supporting plate (42), there are a plurality of supporting plates (42), wherein the plurality of supporting plates (42) are in one-to-one correspondence with the plurality of turn-up structures (41), and the supporting plates (42) are arranged on the corresponding turn-up structures (41) so as to provide a lap platform for a side wall during the movement of the turn-up structures (41) from the retracted position to the supporting position;
  a first driving assembly (43), wherein the first driving assembly (43) is arranged on the main shaft assembly (10), and the first driving assembly (43) is in drive connection with the plurality of turn-up structures (41);
  during the movement of the turn-up structure (41) from the supporting position to the retracted position, a suspension arm (21) of the rear delay unloading (20) is able to stretch into a space between the side wall and the turn-up structure (41), and drive the side wall to move in a direction away from the turn-up structure (41);

wherein the turn-up structure (41) comprises:
a turn-up connecting rod (411), the turn-up connecting rod (411) being in drive connection with the first driving assembly (43), and the supporting plate (42) being provided on the turn-up connecting rod (411),
wherein the turn-up connecting rod (411) is connected to one end of the first driving assembly (43) close to the lock ring assembly (30).

\* \* \* \* \*